(12) United States Patent
Kato et al.

(10) Patent No.: US 8,252,709 B2
(45) Date of Patent: Aug. 28, 2012

(54) CATALYST FOR HYDRODESULFURIZATION/DEWAXING OF HYDROCARBON OIL, PROCESS FOR PRODUCING THE SAME, AND METHOD OF HYDROTREATING HYDROCARBON OIL WITH THE CATALYST

(75) Inventors: Yoshinori Kato, Satte (JP); Hiroshi Kimura, Satte (JP); Kazuyuki Kiriyama, Satte (JP); Takashi Fujikawa, Satte (JP)

(73) Assignee: Cosmo Oil Co., Ltd., Tokyo (JP)

( * ) Notice: Subject to any disclaimer, the term of this patent is extended or adjusted under 35 U.S.C. 154(b) by 796 days.

(21) Appl. No.: 12/299,329

(22) PCT Filed: Sep. 10, 2007

(86) PCT No.: PCT/JP2007/067613
§ 371 (c)(1),
(2), (4) Date: Dec. 3, 2008

(87) PCT Pub. No.: WO2008/032686
PCT Pub. Date: Mar. 20, 2008

(65) Prior Publication Data
US 2009/0071875 A1 Mar. 19, 2009

(30) Foreign Application Priority Data
Sep. 14, 2006 (JP) ................................. 2006-249445

(51) Int. Cl.
B01J 29/06 (2006.01)
B01J 27/182 (2006.01)
C10G 45/04 (2006.01)
C10G 25/05 (2006.01)

(52) U.S. Cl. ................ 502/60; 502/62; 502/63; 502/64; 502/66; 502/71; 502/74; 502/77; 502/78; 502/208; 502/209; 502/210; 502/211; 502/213; 502/214; 208/209; 208/213

(58) Field of Classification Search ............. 502/60, 502/62, 63, 64, 66, 74, 77, 71, 78, 208, 209, 502/210, 211, 213, 214; 208/209, 213
See application file for complete search history.

(56) References Cited

U.S. PATENT DOCUMENTS

| 6,063,265 | A | 5/2000 | Chiyoda et al. |
| 7,737,071 | B2 * | 6/2010 | Kiriyama et al. ............ 502/170 |
| 2003/0173256 | A1 * | 9/2003 | Fujikawa et al. ............ 208/217 |

FOREIGN PATENT DOCUMENTS

| EP | 1 402 948 A1 | 3/2004 |
| EP | 1 577 007 A1 | 9/2005 |
| EP | 1 733 787 A1 | 12/2006 |
| JP | 50-17401 | 2/1975 |
| JP | 59-132942 A | 7/1984 |
| JP | 8-67883 A | 3/1996 |
| JP | 2000-342976 A | 12/2000 |
| JP | 2005-262063 A | 9/2005 |
| WO | 03/000410 A1 | 1/2003 |
| WO | 2004/054712 A1 | 7/2004 |

OTHER PUBLICATIONS

Extended European Search Report issued in European Patent Application No. 07807022.4-2104 dated Oct. 15, 2009, English.
Chinese Office Action, dated Jan. 18, 2011, issued in Application No. 200780024100.6.
Office Action issued Mar. 19, 2012 by the State Intellectual Property Office of the People's Republic of China in counterpart Chinese Application No. 200780024100.6.

* cited by examiner

*Primary Examiner* — Elizabeth Wood
(74) *Attorney, Agent, or Firm* — Sughrue Mion, PLLC (57) ABSTRACT

An object of the present invention is to provide a catalyst for hydrodesulfurization/dewaxing of a hydrocarbon oil, with which sulfur compounds in the hydrocarbon oil can be desulfurized to a high degree and which simultaneously is extremely effective in reducing the wax deposit content; a process for producing the catalyst; and a method of hydrotreatment with the catalyst.

The invention relates to a catalyst for hydrodesulfurization/dewaxing of a hydrocarbon oil, comprising a support comprising an inorganic oxide containing at least one crystalline aluminosilicate having a one- or two-dimensional pore path system and, having provided thereon, 10 to 35% by mass of a metal in Group 6 of the Periodic Table, 1 to 10% by mass of a metal in Group 8 of the Periodic Table, and 1.5 to 6% by mass of phosphorus in terms of oxide amount on the basis of the catalyst and further containing 2 to 14% by mass of carbon derived from an organic acid in terms of element amount on the basis of the catalyst, wherein the content of the crystalline aluminosilicate having a one-or two-dimensional pore path system in the support is 3 to 25% by mass on the basis of the support; a process for producing the catalyst; and a method of hydrotreatment with the catalyst.

4 Claims, 1 Drawing Sheet

CATALYST FOR HYDRODESULFURIZATION/DEWAXING OF HYDROCARBON OIL, PROCESS FOR PRODUCING THE SAME, AND METHOD OF HYDROTREATING HYDROCARBON OIL WITH THE CATALYST

TECHNICAL FIELD

The present invention relates to a catalyst for hydrodesulfurization/dewaxing of a hydrocarbon oil, a process for producing the same, and a method of hydrotreating a hydrocarbon oil with the catalyst. More specifically, it relates to a catalyst capable of reducing sulfur concentration in a product oil and simultaneously reducing wax deposit content at hydrotreatment of a light gas oil fraction, a process for producing the same, and a method of hydrotreating a hydrocarbon oil with the catalyst.

BACKGROUND ART

In order to improve air environment, it is an important object to reduce nitrogen oxides ($NO_x$), suspended particulate matter (SPM), and the like discharged from diesel-powered automobiles. As a method for reducing these pollutants, it is considered to be effective to mount an exhaust gas-treating apparatus on the diesel-powered automobiles. However, since the exhaust gas-treating apparatus is frequently less resistant to sulfur, it is desirable to reduce sulfur content contained in a fuel oil (light gas oil) to a large degree in order to efficiently function the apparatus. Thus, in order to cope with these requests, various desulfurization catalyst technologies having an excellent desulfurization performance have been proposed (e.g., see Patent Documents 1 and 2).

With regard to the properties of the light gas oil to be used as a fuel oil for the diesel-powered automobiles, low-temperature fluidity is also an important factor in addition to the sulfur concentration. In the light gas oil fraction where sulfur reduction is achieved by a general hydrotreatment method, there is a tendency that wax matter is apt to precipitate at a low temperature and thus low-temperature fluidity performance decreases. Thus, as one method for compensating the decrease, it is considered that a kerosene fraction is mixed with the light gas oil fraction to enhance the low-temperature fluidity performance and thus practical performance as a product light gas oil is secured.

However, since demand for the kerosene fraction increases in winter where the low-temperature fluidity performance is more desired, the use of the kerosene fraction for securing the low-temperature fluidity performance of light gas oil is not preferred in view of the balance of supply and demand. Accordingly, there has been strongly requested a catalyst capable of ultra-deep desulfurization of the light gas oil fraction and also having dewaxing activity which enables enhancement of the low-temperature fluidity performance so as to be sufficient for reducing the mixing amount of the kerosene fraction at production of product light gas oil.

As a method for performing dewaxing and desulfurization of the light gas oil fraction simultaneously, there has been proposed a method for dewaxing and desulfurization of a light gas oil fraction using two kinds of catalysts, wherein the light gas oil fraction is first brought into contact with ZSM-5 type zeolite which may contain a hydrogenation component to achieve dewaxing treatment and subsequently desulfurization treatment is performed with a conventional hydrodesulfurization catalyst (e.g., see Patent Document 3).

In addition, as a technology aiming at improvement of both of desulfurization performance and dewaxing performance which targets not the light gas oil fraction but mainly a heavy oil, there has been proposed a catalyst mixing ZSM-5 type zeolite and a specific support and containing oxides or sulfides of the metal in Group 6 and the metal in Group 8 (e.g., see Patent Document 4).

Patent Document 1: WO2004/054712
Patent Document 2: WO2003/000410
Patent Document 3: JP-A-50-17401
Patent Document 4: JP-A-59-132942

DISCLOSURE OF THE INVENTION

Problems that the Invention is to Solve

However, in any of the above technologies, there has not yet been realized a catalyst technology capable of achieving ultra-deep desulfurization of a light gas oil fraction without making operating conditions severe and having a high performance sufficiently effective for reduction of a wax deposit content.

An object of the invention is to provide a catalyst for hydrodesulfurization/dewaxing of a hydrocarbon oil, with which sulfur compounds in a hydrocarbon oil can be desulfurized to a high degree without making operating conditions severe and which simultaneously is extremely effective in reducing the wax deposit content; and a process for producing the same. Furthermore, it is to provide a method of hydrotreating a hydrocarbon oil with the catalyst, by which a hydrocarbon oil having a sulfur concentration of 10 ppm or less and a wax deposit content at −10° C. of 3.0% by mass or less can be obtained.

Means for Solving the Problems

As a result of the extensive studies for solving the above problems, the present inventors have found that the above problems are solved by the use of a catalyst having a specific constitution and thus have accomplished the present invention. Namely, the invention provides a catalyst having a constitution described below, a process for producing the catalyst, and a method of hydrotreating a hydrocarbon oil with the catalyst.

(1) A catalyst for hydrodesulfurization/dewaxing of a hydrocarbon oil, which comprises a support comprising an inorganic oxide containing at least one crystalline aluminosilicate having a one- or two-dimensional pore path system and, having provided thereon, 10 to 35% by mass of at least one selected from metals in Group 6 of the Periodic Table, 1 to 10% by mass of at least one selected from metals in Group 8 of the Periodic Table, and 1.5 to 6% by mass of phosphorus in terms of oxide amount on the basis of the catalyst, and 2 to 14% by mass of carbon derived from an organic acid in terms of element amount on the basis of the catalyst,
wherein the content of the crystalline aluminosilicate being 3 to 25% by mass on the basis of the support.

(2) The catalyst for hydrodesulfurization/dewaxing of a hydrocarbon oil according to the above (1), wherein the $SiO_2/Al_2O_3$ ratio (mol/mol) of the crystalline aluminosilicate having a one- or two-dimensional pore path system is 15 to 200 and maximum pore diameter is 0.4 to 0.72 nm.

(3) The catalyst for hydrodesulfurization/dewaxing of a hydrocarbon oil according to the above (1) or (2), wherein specific surface area is 100 to 350 $m^2/g$, pore volume is 0.35 to 0.6 ml/g, and mean pore diameter is 6 to 20 nm.

(4) A process for producing the catalyst for hydrodesulfurization/dewaxing of a hydrocarbon oil according to any one of the above (1) to (3), which comprises:

supporting on a support composed of an inorganic oxide containing 3 to 25% by mass of at least one crystalline aluminosilicate having a one- or two-dimensional pore path system on the basis of the support with the use of a solution containing at least one compound containing a metal in Group 6 of the Periodic Table, at least one compound containing a metal in Group 8 of the Periodic Table, an organic acid, and phosphoric acid so that the metal in Group 6 of the Periodic Table accounts for 10 to 35% by mass, the metal in Group 8 of the Periodic Table accounts for 1 to 10% by mass, phosphorus accounts for 1.5 to 6% by mass in terms of oxide amount on the basis of the catalyst, and carbon derived from an organic acid accounts for 2 to 14% by mass in terms of element amount on the basis of the catalyst and subsequently;

drying at 200° C. or lower without calcination treatment at higher than 200° C. to finish a catalyst.

(5) A process for hydrotreating a hydrocarbon oil, which comprises producing a hydrocarbon oil having a sulfur content in the product oil of 10 mass ppm or less and a wax deposit content at −10° C. of 3.0% by mass using a hydrocarbon oil having a boiling point range of 150° C. to 450° C. as a raw oil under a hydrogen partial pressure of 3 to 13 MPa, a temperature of 300 to 400° C., a liquid hourly space velocity of 0.3 to 5 h$^{-1}$, and a hydrogen/oil ratio of 100 to 1000 Nm$^3$/kl in the presence of the catalyst according to any one of the above (1) to (3).

Advantage of the Invention

According to the present invention, there is provided a catalyst for hydrodesulfurization/dewaxing of a hydrocarbon oil, with which sulfur compounds in a hydrocarbon oil can be desulfurized to a high degree without making operating conditions severe and which simultaneously enables sufficient reduction of the wax deposit content and improvement of low-temperature fluidity of the hydrocarbon oil as well as a process for producing the same. Furthermore, there is provided a method of hydrotreating a hydrocarbon oil, by which a hydrocarbon oil having a sulfur concentration of 10 ppm or less and a wax deposit content at −10° C. of 3.0% by mass or less can be obtained with the use of the catalyst.

BRIEF DESCRIPTION OF THE DRAWINGS

[FIG. 1]

[FIG. 2]

BEST MODE FOR CARRYING OUT THE INVENTION

The following will explain the catalyst for hydrodesulfurization/dewaxing of a hydrocarbon oil (hereinafter simply referred to as "hydrodesulfurization/dewaxing catalyst" or "catalyst") of the invention and a process for producing the same as well as a method of hydrotreatment with the catalyst in detail.

[Catalyst of the Invention]

The catalyst of the invention uses a support composed of an inorganic oxide containing at least one crystalline aluminosilicate having a one- or two-dimensional pore path system. In the catalyst of the invention, as the crystalline aluminosilicate having a one- or two-dimensional pore path system to be contained in the support, a crystalline aluminosilicate having a one-dimensional pore path system can be used, a crystalline aluminosilicate having a two-dimensional pore path system can be also used, and these crystalline aluminosilicates can be also used in combination. In the case where these crystalline aluminosilicates are used in combination, the combination ratio of individual crystalline aluminosilicates can be arbitrarily set.

As the inorganic oxide constituting the support, there may be, for example, mentioned γ-alumina, θ-alumina, η-alumina, δ-alumina, silica, boria, titania, zirconia, magnesia, hafnia, and the like. They can be used singly or two or more inorganic oxides can be used as a mixture in combination. When two or more inorganic oxides are mixed, individual ingredients are preferably uniformly and homogeneously mixed as a whole.

As the crystalline aluminosilicate having a one- or two-dimensional pore path system to be contained in the support inorganic oxide, there may be, for example, mentioned L-type zeolite, ZSM-5, ZSM-11, ZSM-12, ZSM-23, ZSM-38, SAPO-5, SAPO-11, SAPO-34, mordenite, ferrierite, beta-zeolite, and the like, and preferred are ZSM-5, ZSM-11, ZSM-12, ZSM-23, ZSM-38, SAPO-11, mordenite, and ferrierite, more preferred are ZSM-5 and SAPO-11, and most preferred is ZSM-5. The pore path shown here means a tunnel-like space having a specific size formed by the crystalline aluminosilicate, and the crystalline aluminosilicate has a structure where the pore paths are crossed one-dimensionally to three-dimensionally depending on the kind of the crystalline aluminosilicate (reference literature: Zeolite no Kagaku to Ohyo (Science and Application of Zeolite); edited by Hiroo Tominaga, p. 17, Kodansha (1996)). In the crystalline aluminosilicate contained in the catalyst of the invention, the pore path system has a one- or two-dimensional structure and a sufficient dewaxing activity can be exhibited thanks to the structure. The reason is presumed as follows. The wax deposit content is mainly originated from long-chain linear hydrocarbons and the precipitation of the wax content in a hydrocarbon oil can be suppressed through decomposition of the long-chain linear hydrocarbons into hydrocarbons having smaller number of carbon atoms. The decomposition reaction is considered to occur in the pores of the crystalline aluminosilicate. The invention is based on the finding that an efficient decomposition reaction is obtained in the case where the pore path system of the crystalline aluminosilicate is a one- or two-dimensional structure. Even when crystalline aluminosilicates where the pore path system is three-dimensional one like Y-type zeolite is contained in the catalyst support, a sufficient dewaxing activity cannot be obtained.

In these crystalline aluminosilicates having a one- or two-dimensional pore path system, the SiO$_2$/Al$_2$O$_3$ ratio (mol/mol) is preferably 15 to 200, more preferably 25 to 150. By controlling the SiO$_2$/Al$_2$O$_3$ ratio (mol/mol) to from 15 or more to 200 or less, the aluminosilicate can be converted to have a suitable acid nature by a dewaxing reaction and, as a result, the dewaxing performance can be further improved.

Moreover, the maximum pore diameter formed by the crystalline aluminosilicate having a one- or two-dimensional pore path system is preferably 0.4 to 0.72 nm. By controlling the maximum pore diameter to 0.4 nm or more, diffusion of the linear hydrocarbons, which is a main cause of the wax deposit content, into the crystalline aluminosilicate can be more improved. On the other hand, the ingredients which are not main causes of the wax deposit content are preferably not decomposed but, among such ingredients, since particularly a part of aromatic hydrocarbons and the like may be deposited as cokes when reacted in the pores of the crystalline aluminosilicate and thus become a main cause of activity deactivation in some cases, so that it is preferred to suppress the deposition. Thus, the maximum pore diameter of the crystalline aluminosilicate is preferably 0.72 nm or less where the diffusion of the hydrocarbons into the pores, which may be a main cause of deactivation, can be suppressed. As the crystalline aluminosilicates satisfying the requirement of the maximum pore diameter of the above range, there may be mentioned L-type zeolite, ZSM-5, ZSM-11, ZSM-12, ZSM-23, ZSM-38, SAPO-11, SAPO-34, mordenite, ferrierite, and the like.

The crystalline aluminosilicate having a one- or two-dimensional pore path system and the inorganic oxide to be used as a support are preferably homogeneously mixed and, with regard to a mixing method thereof, a commonly used method, e.g., a physical mixing method or the like can be used.

The crystalline aluminosilicate having a one- or two-dimensional pore path system is contained in the support in an amount of 3 to 25% by mass, preferably 5 to 20% by mass, more preferably 5 to 10% by mass. A sufficient dewaxing performance can be exhibited by controlling the content of the crystalline aluminosilicate to 3% by mass or more, and a sufficient dewaxing performance and also a high desulfurization performance can be maintained by controlling the content to 25% by mass or less.

As the above inorganic oxide support containing the crystalline aluminosilicate having a one- or two-dimensional pore path system, one calcined at 500° C. to 700° C. for 2 to 5 hours is preferably used. This is because catalyst preparation is completed by drying at 200° C. or lower without high-temperature calcination after an active metal is supported on the support in the case where the catalyst of the invention is produced by the production process described below and also the support itself is preferably calcined under the above conditions in order to exhibit a sufficient mechanical strength as such a catalyst. When the calcination temperature is controlled to 500° C. or higher and the calcination time to 2 hours or more, a sufficient catalyst strength can be obtained and when they are controlled to 700° C. or lower and 5 hours or less, respectively, desired physical properties are obtained and also the process is economical without consuming an extra energy, so that the conditions are preferred.

By controlling the specific surface area, pore volume, and mean pore diameter of the inorganic oxide support containing the crystalline aluminosilicate having a one- or two-dimensional pore path system to the ranges shown in the following, a catalyst having higher desulfurization performance and dewaxing performance can be achieved.

The specific surface area of the support is preferably 200 to 500 m$^2$/g, more preferably 200 to 400 m$^2$/g. When the specific surface area of the support is 200 m$^2$/g or more, the metal in Group 6 and the metal in Group 8 which are presumed to form a complex in an impregnation solution are easily supported on the support with a sufficient dispersibility, so that the case is preferred. Moreover, when it is 500 m$^2$/g or less, since the pore diameter is not extremely small, a reaction-target compound is easily diffused into the catalyst pores, so that the case is preferred. In this connection, the above specific surface area is a value determined by a nitrogen-adsorption method (BET method).

Furthermore, the pore volume of the support is preferably 0.5 to 1.0 ml/g, more preferably 0.55 to 0.9 ml/g. When the pore volume is 0.5 ml/g or more, in the case where an active metal is supported by an impregnation method, a solution amount sufficient for maintaining solubility of an active metal compound can be secured and the active metal is easily supported with high dispersion, so that the case is preferred. Moreover, when the pore volume is 1.0 ml/g or less, since the specific surface area is not extremely lowered, dispersibility of the active metal is easily supported without lowering dispersibility of the active metal, so that the case is preferred. In this connection, the above pore volume is a value determined by a mercury-intrusion method.

The mean pore diameter of the support is in the rage of 5 to 16 nm, preferably 6 to 13 nm, more preferably 6 to 11 nm. When the mean pore diameter is 5 nm or more, a reaction target compound is easily diffused in the catalyst pores, so that the case is preferred. Moreover, when the diameter is 16 nm or less, extreme decrease in the specific surface area can be prevented and the active metal is easily supported with high dispersion, so that the case is preferred. In this connection, the above mean pore diameter is a value determined by a mercury-intrusion method.

The catalyst of the invention comprises at least one selected from metals in Group 6 of the Periodic Table and at least one selected from metals in Group 8 of the Periodic Table, as well as phosphorus and carbon derived from an organic acid. As the metal in Group 6, molybdenum, tungsten, or chromium is used but molybdenum or tungsten is preferred. In addition, two or more of the metals in Group 6 can be used in combination. As raw materials for these metals in Group 6, various compounds can be used and, as particularly preferred ones, molybdenum trioxide, tungsten oxide, molybdophosphoric acid, and tungstophosphoric acid are mentioned. These compounds can be used singly or two or more thereof can be also used in combination.

As the metal in Group 8, nickel or cobalt is preferred. In addition, nickel and cobalt can be also used in combination. As raw materials for these metals in Group 8, various compounds can be used and, as preferred ones, nickel carbonate, cobalt carbonate, nickel citrate, and cobalt citrate are mentioned and, as particularly preferred ones, nickel citrate and cobalt citrate having a higher decomposition temperature are mentioned. These compounds can be used singly or two or more thereof can be also used in combination.

As raw materials for phosphorus, various phosphorus compounds can be used and, as particularly preferred one, orthophosphoric acid is mentioned. Moreover, in the case where a phosphate salt of a metal in Group 6 is used as a raw material for the metal in Group 6, phosphorus contained in the compound can be used as a phosphorus source. These phosphorus raw materials can be used singly or two or more thereof can be also used in combination. Furthermore, in the case where the phosphorus matter in the phosphate salt of the metal in Group 6 is used as a phosphorus source but the phosphorus amount from the raw material alone is not sufficient, the other phosphorus raw material such as orthophosphoric acid can be further used in combination.

As the organic acid, various organic acids can be used but, as preferred organic acids, carboxylic acids are mentioned and more preferably, polybasic carboxylic acid, particularly preferably aliphatic polybasic carboxylic acids are mentioned. As the aliphatic polybasic carboxylic acids, for example, citric acid, malic acid, tartaric acid, oxalic acid, succinic acid, malonic acid, adipic acid, gluconic acid, and the like are mentioned and most preferred thereof is citric acid. Moreover, in the case where a compound of an organic acid with a metal in Group 8 such as nickel citrate or cobalt citrate is, for example, used as a raw material for the metal in Group 8, this compound can be also used as an organic acid source. In the case where these organic acids are used, one acid can be used singly or two or more acids can be also used in combination. Moreover, in the case where the organic acid of the compound of the organic acid with the metal in Group 8 is used as an organic acid source, when the amount of the organic acid from the compound alone is not sufficient, the other organic acid raw material can be further used in combination.

The amount of the metal in Group 6 to be supported is 10 to 35% by mass, preferably 12 to 35% by mass, particularly preferably 15 to 30% by mass in terms of oxide amount on the basis of the catalyst. When the amount is 10% by mass or more, it is possible to sufficiently exhibit an effect caused by the metal in Group 6 and, when the amount is 35% by mass or less, the metal in Group 6 can be efficiently dispersed on the support without formation of aggregation of the compound of the metal in Group 6 in the step of supporting the metal in Group 6, so that the cases are preferred.

The amount of the metal in Group 8 to be supported is 1 to 10% by mass, preferably 2.5 to 8% by mass in terms of oxide amount on the basis of the catalyst. When the amount is 1% by mass or more, it is possible to sufficiently obtain an active point attributable to the metal in Group 8 and, when the amount is 10% by mass or less, it is possible to maintain the dispersibility of the metal in Group 8 on the support without formation of aggregate in the step of supporting the metal in Group 8, so that the cases are preferred.

Moreover, with regard to the mass ratio (in terms of oxide amount) of the metal in Group 6 to the metal in Group 8, the value of the metal in Group 8/(the metal in Group 6+the metal in Group 8) is preferably 0.1 to 0.25. When the value of the metal in Group 8/(the metal in Group 6+the metal in Group 8) is 0.1 or more, formation of an active point deeply relating to desulfurization performance (e.g., CoMoS phase, NiMoS phase, etc.) can be efficiently obtained and a synergistic effect of the metal in Group 6 and the metal in Group 8 can be further increased. On the other hand, when the value is 0.25 or less, formation of inactive species of the metal in Group 8 can be suppressed.

The phosphorus content is 1.5 to 6% by mass, preferably 2.5 to 6% by mass in terms of oxide amount on the basis of the catalyst. Phosphorus has an effect of effective utilization of the active metal and acceleration of formation of a sulfided structure which is considered to have a high desulfurization activity. In order to sufficiently exhibit such an effect, it is preferred to control the phosphorus content to 1.5% by mass or more. On the other hand, too large phosphorus content may cause occurrence of reduction of pore size of the catalyst and, as a result, decrease in diffusivity of the target compound and excessive aggregation of the active metal may occur and thus catalyst performance may decrease in some cases. Therefore, the phosphorus content is preferably 6% by mass or less.

Moreover, the most suitable molar ratio of the phosphorus content to the content of the metals in Group 8 is 0.07 to 0.3, preferably 0.09 to 0.25 as the value of $P_2O_5/MoO_3$. When the molar ratio of the phosphorus content to the content of the metals in Group 8 is 0.07 or more, the sulfided structure which is considered to have a high desulfurization activity can be more efficiently formed, so that the case is preferred. Moreover, when the ratio is 0.3 or less, decrease in pore volume and specific surface area of the catalyst can be suppressed and decrease in catalyst performance can be suppressed, so that the case is preferred.

The content of carbon derived from an organic acid is 2 to 14% by mass, preferably 2 to 10% by mass, more preferably 2 to 5% by mass in terms of element amount on the basis of the catalyst. The organic acid forms a complex compound with the metal of Group 8 on the support at the production of the catalyst and, when supported in this state, has an effect of forming an active point structure which is considered to have a higher activity through successive activation treatment (sulfiding treatment). In order to sufficiently exhibit such an effect, it is necessary to use the organic acid in an amount of at least 2% by mass in terms of carbon element amount. On the other hand, when the organic acid is excessively used, the carbon matter derived from the organic acid may deposit on the catalyst and there is a fear of decrease in activity owing to coverage of the catalyst active point or the like. Therefore, the amount of the organic acid is preferably 14% by mass or less in terms of carbon element amount.

Moreover, the amount of the organic acid to be added relative to the amount of the metal in Group 8 is preferably 0.2 to 1.2, more preferably 0.6 to 1 as a molar ratio of the organic acid/the metal in Group 8. When the organic acid/the metal in Group 8 is controlled to 0.2 or more, the active point attributable to the metal in Group 8 is more easily obtained, so that the case is preferred. On the other hand, when the organic acid/the metal in Group 8 is controlled to 1.2 or less, formation of the metal impregnation solution having too high viscosity can be suppressed, the impregnation solution easily penetrates into the inside of the support, and the active metal is easily supported with high dispersion, so that the case is preferred.

Furthermore, with regard to the amount of the organic acid to be added relative to the total amount of the metals in Group 6 and the metals in Group 8, the molar ratio of the organic acid/(the metals in Group 6+the metals in Group 8) is preferably 0.35 or less, more preferably 0.28 or less, particularly preferably 0.25 or less. When the organic acid/(the metals in Group 6+the metals in Group 8) is controlled to 0.35 or less, coke deactivation owing to the metal and the excess organic acid which does not form a complex can be suppressed, so that the case is preferred.

As a process for producing the catalyst of the invention, there is preferred a process for producing the catalyst by using a solution containing at least one selected from metals in Group 6, at least one selected from metals in Group 8, phosphoric acid, and an organic acid, supporting the components on the above crystalline aluminosilicate-containing inorganic oxide support so as to attain a predetermined content, and subsequently finishing the product through only drying treatment and drying it without high-temperature calcination treatment.

As a supporting method of the above components on the support, a common method can be used and the method may be anyone so far as a predetermined amount of the active metal can be homogeneously supported. As such a method, an impregnation method is mentioned, for example.

The drying method is not particularly limited but there is preferred a method of drying at a drying temperature of 200° C. or lower, preferably 100 to 180° C. for 10 minutes to 24 hours, more preferably 100 to 150° C. for 5 to 24 hours in an air stream, in a nitrogen stream, or in vacuum after air-dried at room temperature. When the drying temperature is controlled to 200° C. or lower, the active metal and the organic acid which are considered to form a complex can be maintained on the catalyst and, as a result, a highly active catalyst can be obtained by performing activation treatment.

However, in the case where drying is performed in vacuum, drying is preferably performed so as to be the above temperature range in terms of a pressure of 760 mmHg. The pressure at drying is generally 300 to 900 mmHg, preferably 700 to 850 mmHg, more preferably 730 to 800 mmHg, further preferably atmospheric pressure. When the pressure at drying is 300 mmHg or more, the boiling point in terms of 760 mmHg is not higher than 200° C. and the organic acid which has formed a complex with the metal does not easily eliminated, so that a highly active catalyst can be obtained through the activation treatment.

The specific surface area in the catalyst of the invention is preferably 100 to 350 m²/g, more preferably 120 to 300 m²/g. When the specific surface area is 100 m²/g or more, the active metal is easily highly dispersed, so that the case is preferred. When the area is 350 m²/g or less, since the catalyst pore diameter is not extremely-decreased, the reaction target compound is easily sufficiently diffused, so that the case is preferred.

The pore volume in the catalyst of the invention is preferably 0.35 to 0.6 ml/g, more preferably 0.35 to 0.55 ml/g. When the pore volume is 0.35 ml/g or more, the reaction target compound is easily diffused in the pores, so that the case is preferred. When the pore volume is 0.6 ml/g or less, since the specific surface area is not extremely lowered, dispersibility of the active metal is easily maintained, so that the case is preferred.

The mean pore diameter in the catalyst of the invention is preferably 6 to 20 nm, more preferably 7 to 15 nm, further preferably 8 to 15 nm. When the mean pore diameter is 6 nm or more, the reaction target compound is easily diffused in the catalyst pores, so that the case is preferred. When the diameter is 20 nm or less, the specific surface area is not extremely decreased and high dispersibility of the active metal is easily maintained, so that the case is preferred.

The volume of the pores having a mean pore diameter ranging ±1.5 nm measured by the mercury-intrusion method in the catalyst of the invention accounts for preferably 40% by volume or more, more preferably 45% by volume or more based on the total pore volume. When the volume of the pores having a mean pore diameter ranging ±1.5 nm is 40% by volume or more based on the total pore volume, the pores which are not useful for desulfurization and dewaxing of the reaction target compound can be suppressed and the catalyst performance can be further improved, so that the case is preferred.

In this connection, the above specific surface area is a numerical value determined by the BET method after the catalyst is degassed under vacuum at 400° C. for 1 hour. Moreover, the pore volume and mean pore diameter are numerical values determined by the mercury-intrusion method after the catalyst is degassed under vacuum at 400° C. for 1 hour.

[Raw Material Oil to be Targeted by Catalyst of the Invention]

As the hydrocarbon oils to be raw oils at the time when hydrodesulfurization and hydrodewaxing are performed simultaneously with the catalyst of the invention, various hydrocarbon oils can be used and are not limited but hydrocarbon oils having a boiling point range of 150 to 450° C., preferably 150 to 400° C. are suitable and straight-run light gas oil is preferably mentioned. Moreover, hydrocarbon oils having a wax deposit content at −10° C. of 10% by mass or less, further 6% by mass or less can be also preferably used. Furthermore, cracked light gas oil, reduced pressure light gas oil, hydrotreated oil, desulfurized oil, and the like can be also used singly or in combination. In this connection, hydrotreatment of lubricating base oils can be preformed with the catalyst of the invention.

[Hydrogenation with Catalyst of the Invention]

At the hydrotreatment of a raw material hydrocarbon oil with the catalyst of the invention, it is necessary to activate the catalyst of the invention by sulfiding treatment with a sulfiding agent beforehand. The sulfiding treatment is generally performed at a temperature of 230 to 400° C., preferably 250 to 350° C. under a hydrogen atmosphere to convert most of the supported metal components into sulfides. As the sulfiding agent at the sulfiding treatment, the sulfur matter in the raw material hydrocarbon oil can be utilized or an additional sulfiding agent can be also used. The catalyst of the invention is used in the hydrotreatment of the raw material hydrocarbon oil after subjected to the sulfiding treatment beforehand.

With regard to the reaction conditions for the hydrotreatment of the raw material hydrocarbon oil with the catalyst of the invention, generally, hydrogen partial pressure is 3 to 13 MPa, preferably 4 to 11 MPa. The reaction temperature is 300 to 400° C., preferably 310 to 385° C.; the liquid hourly space velocity is 0.3 to 5 h$^{-1}$, preferably 0.5 3.5 h$^{-1}$; and the hydrogen/oil ratio is 100 to 1000 Nm³/kl, preferably 150 to 800 Nm³/kl. The hydrotreatment of the raw material oil with the catalyst of the invention is preferably performed under the above conditions.

As an embodiment of performing the hydrotreatment of the hydrocarbon oil, a fixed bed flow reaction method is preferred. In this connection, as a catalyst to be packed into a hydrotreatment apparatus, it is possible to use the catalyst of the invention singly or it is possible to use the catalyst of the invention in combination with the other ultra-deep desulfurization catalyst or the like in order to obtain desired properties of a product oil.

As mentioned above, at the hydrotreatment of the hydrocarbon oil, by the use of the catalyst of the invention, sulfur compounds in the hydrocarbon oil can be desulfurized to a high degree and simultaneously, it is possible to reduce wax content without making the operating conditions severe. Furthermore, the use of the catalyst enables production of a hydrocarbon oil having a sulfur content of 10 ppm or less and a wax deposit content at −10° C. of 3.0% by mass.

[Characteristics of Product Oil Produced with Catalyst of the Invention]

According to the catalyst of the invention, at the hydrotreatment of various hydrocarbon oils, the sulfur compounds in the hydrocarbon oils can be desulfurized to a high degree and simultaneously, it is possible to reduce wax content without making the operating conditions severe.

By the use of the catalyst of the invention, it is possible to produce a hydrocarbon oil having a sulfur concentration of 10 ppm or less and a wax deposit content at −10° C. of 3.0% by mass. The hydrocarbon oil having a sulfur concentration of 10 ppm or less and a wax deposit content at −10° C. of 3.0% by mass satisfies the sulfur concentration required for the diesel fuel and also low-temperature fluidity performance is remarkably improved as compared with conventional general desulfurized light gas oil base materials. Such hydrocarbon oil can remarkably reduce the mixing amount of the kerosene fraction which has been frequently necessarily mixed in the conventional general desulfurized light gas oil base material for the purpose of securing low-temperature performance such as low-temperature fluidity as a diesel fuel. Moreover, by the use of the catalyst of the invention, the wax deposit content at −10° C. can be further reduced to 2.4% by mass or less. Thereby, in the application to No. 2 light gas oil as JIS standard light gas oil where low-temperature fluidity performance is particularly required, for example, low-temperature performance required for No. 2 light gas oil can be secured without mixing the kerosene fraction which has been conventionally mixed for improving the low-temperature performance. In the hydrocarbon oil to be used as the diesel fuel, it is a significant requirement for securing a sufficient low-temperature performance of the hydrocarbon oil as a diesel fuel to control the wax deposit content at −10° C. to a certain level or less.

The above wax deposit content can be determined by an analyzing method using a filter-filtration method or by an analyzing method using a differential scanning calorimeter (also referred to as "DSC" in short) but, for determining the wax deposit content, analysis by a DSC method showing a high repeat accuracy can be preferably used. DSC is an instrument for analyzing heat budget of a sample at the time when the sample temperature is continuously changed but the precipitated amount of wax matter precipitated in the hydrocarbon oil can be determined by measuring heat budget in association with the wax matter precipitation.

EXAMPLES

The following will more specifically describe the present invention with reference to Examples and Comparative Examples but the invention is not limited to the following Examples.

[Preparation of Catalyst]

Example 1

H-ZSM-5 zeolite powder having an $SiO_2/Al_2O_3$ molar ratio of 35 (pore path system: two-dimensional one, maximum pore diameter: 0.54 nm) was kneaded into alumina gel and, after extrusion molding, the whole was calcined at 600° C. for 2 hours to prepare a ZSM-5 zeolite-containing alumina support (H-ZSM-5 zeolite/alumina mass ratio=10/90, specific surface area: 317 $m^2/g$, pore volume: 0.72 ml/g, mean pore diameter: 8.5 nm).

On the other hand, after 17.12 g of cobalt citrate and 3.73 g of orthophosphoric acid (85% aqueous solution) were added to 39 g of ion-exchanged water, 29.35 g of molybdophosphoric acid was charged and completely dissolved therein to prepare an aqueous metal solution. The whole amount of the aqueous solution was added dropwise to 50 g of the above ZSM-5 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst A.

Example 2

A ZSM-5 zeolite-containing alumina support having a H-ZSM-5 zeolite/alumina mass ratio of 15/85 (specific surface area: 320 $m^2/g$, pore volume: 0.71 ml/g, mean pore diameter: 8.5 nm) was prepared in the same manner as in Example 1 except that H-ZSM-5 zeolite powder having an $SiO_2/Al_2O_3$ molar ratio of 45 (pore path system: two-dimensional one, maximum pore diameter: 0.54 nm) was used.

On the other hand, after 15.41 g of cobalt citrate and 3.45 g of orthophosphoric acid (85% aqueous solution) were added to 38.5 g of ion-exchanged water, 27.18 g of molybdophosphoric acid was charged and completely dissolved therein to prepare an aqueous metal solution. The whole amount of the aqueous solution was added dropwise to 50 g of the above ZSM-5 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst B.

Example 3

A ZSM-5 zeolite-containing alumina support having a H-ZSM-5 zeolite/alumina mass ratio of 25/75 (specific surface area: 325 $m^2/g$, pore volume: 0.68 ml/g, mean pore diameter: 8.9 nm) was prepared in the same manner as in Example 1.

On the other hand, after 13.06 g of cobalt citrate and 3.26 g of orthophosphoric acid (85% aqueous solution) were added to 36 g of ion-exchanged water, 22.91 g of molybdophosphoric acid was charged and completely dissolved therein to prepare an aqueous metal solution. The whole amount of the aqueous solution was added dropwise to 50 g of the above ZSM-5 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst C.

Example 4

Silica and alumina hydrate and H-ZSM-5 zeolite powder the same as used in Example 1 were kneaded and, after extrusion molding, the whole was calcined at 600° C. for 2 hours to prepare a ZSM-5 zeolite-containing silica-alumina support (H-ZSM-5 zeolite/silica/alumina mass ratio=10/2/88, specific surface area: 310 $m^2/g$, pore volume: 0.71 ml/g, mean pore diameter: 8.7 nm).

On the other hand, after 17.12 g of cobalt citrate and 3.73 g of orthophosphoric acid (85% aqueous solution) were added to 38.5 g of ion-exchanged water, 29.35 g of molybdophosphoric acid was charged and completely dissolved therein to prepare an aqueous metal solution. The whole amount of the aqueous solution was added dropwise to 50 g of the above ZSM-5 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst D.

Example 5

Boria and alumina hydrate and H-ZSM-5 zeolite powder the same as used in Example 1 were kneaded and, after extrusion molding, the whole was calcined at 600° C. for 2 hours to prepare a ZSM-5 zeolite-containing boria-alumina support (H-ZSM-5 zeolite/boria/alumina mass ratio=10/3/87, specific surface area: 313 $m^2/g$, pore volume: 0.73 ml/g, mean pore diameter: 8.9 nm).

On the other hand, after 17.12 g of cobalt citrate and 3.73 g of orthophosphoric acid (85% aqueous solution) were added to 39 g of ion-exchanged water, 29.35 g of molybdophosphoric acid was charged and completely dissolved therein to prepare an aqueous metal solution. The whole amount of the aqueous solution was added dropwise to 50 g of the above ZSM-5 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst E.

Example 6

A ZSM-5 zeolite-containing alumina support having a H-ZSM-5 zeolite/alumina mass ratio of 5/95 (specific surface area: 312 $m^2/g$, pore volume: 0.72 ml/g, mean pore diameter: 8.5 nm) was prepared in the same manner as in Example 1.

On the other hand, after 17.12 g of cobalt citrate and 3.73 g of orthophosphoric acid (85% aqueous solution) were added to 39 g of ion-exchanged water, 29.35 g of molybdophosphoric acid was charged and completely dissolved therein to prepare an aqueous metal solution. The whole amount of the aqueous solution was added dropwise to 50 g of the above ZSM-5 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst F.

Example 7

SAPO-11 zeolite powder having an $SiO_2/Al_2O_3$ molar ratio of 35 (pore path system: one-dimensional one, maximum pore diameter: 0.65 nm) was kneaded into alumina gel and, after extrusion molding, the whole was calcined at 600° C. for 2 hours to prepare a SAPO-11 zeolite-containing alumina support (SAPO-11 zeolite/alumina mass ratio=10/90, specific surface area: 301 $m^2/g$, pore volume: 0.65 ml/g, mean pore diameter: 8.7 nm).

On the other hand, after 17.12 g of cobalt citrate and 3.73 g of orthophosphoric acid (85% aqueous solution) were added to 35.5 g of ion-exchanged water, 29.35 g of molybdophosphoric acid was charged and completely dissolved therein to prepare an aqueous metal solution. The whole amount of the aqueous solution was added dropwise to 50 g of the above SAPO-11 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst G.

Example 8

H-beta zeolite powder having an $SiO_2/Al_2O_3$ molar ratio of 25 (pore path system: two-dimensional one, maximum pore diameter: 0.76 nm) was kneaded into alumina gel and, after extrusion molding, the whole was calcined at 600° C. for 2 hours to prepare a H-beta zeolite-containing alumina support (H-beta zeolite/alumina mass ratio=10/90, specific surface area: 342 $m^2/g$, pore volume: 0.74 ml/g, mean pore diameter: 8.7 nm).

On the other hand, after 17.12 g of cobalt citrate and 3.73 g of orthophosphoric acid (85% aqueous solution) were added to 39.5 g of ion-exchanged water, 29.35 g of molybdophosphoric acid was charged and completely dissolved therein to prepare an aqueous metal solution. The whole amount of the aqueous solution was added dropwise to 50 g of the above H-beta zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst H.

Comparative Example 1

Catalyst a was prepared in the same manner as in Example 1 except that the whole amount of the aqueous solution was added dropwise to the ZSM-5 zeolite-containing alumina support, impregnation was then performed at room temperature for 3 hours, and the whole was air-dried in a nitrogen stream and then dried at 500° C. for 4 hours in an air stream at atmospheric pressure in a muffle furnace.

Comparative Example 2

After 17.12 g of cobalt citrate and 3.73 g of orthophosphoric acid (85% aqueous solution) were added to 41 g of ion-exchanged water, 29.35 g of molybdophosphoric acid was charged and completely dissolved therein to prepare an aqueous metal solution. The whole amount of the aqueous solution was added dropwise to 50 g of an alumina support (specific surface area: 328 $m^2/g$, pore volume: 0.77 ml/g, mean pore diameter: 8.3 nm), followed by impregnation at room temperature for 3 hours. Thereafter, the whole was air-dried in a nitrogen stream and then dried at 120° C. for 16 hours in an air stream at atmospheric pressure in a muffle furnace to obtain Catalyst b.

Comparative Example 3

Catalyst c was prepared in the same manner as in Example 1 except that 7.58 g of cobalt carbonate is used instead of 17.12 g of cobalt citrate.

Comparative Example 4

SHY zeolite powder having an $SiO_2/Al_2O_3$ molar ratio of 6 (pore path system: three-dimensional one, maximum pore diameter: 0.74 nm) was kneaded into alumina gel and, after extrusion molding, the whole was calcined at 600° C. for 2 hours to prepare a SHY zeolite-containing alumina support (SHY zeolite/alumina mass ratio=5/95, specific surface area: 320 $m^2/g$, pore volume: 0.79 ml/g, mean pore diameter: 8.9 nm).

On the other hand, after 17.12 g of cobalt citrate and 3.73 g of orthophosphoric acid (85% aqueous solution) were added to 45 g of ion-exchanged water, 29.35 g of molybdophosphoric acid was charged and completely dissolved therein to prepare an aqueous metal solution. The whole amount of the aqueous solution was added dropwise to 50 g of the above SHY zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst d.

Comparative Example 5

A ZSM-5 zeolite-containing alumina support having a ZSM-5 zeolite/alumina mass ratio of 35/65 (specific surface area: 333 $m^2/g$, pore volume: 0.57 ml/g, mean pore diameter: 9.8 nm) was prepared in the same manner as in Example 1.

On the other hand, after 10.78 g of cobalt citrate and 2.33 g of orthophosphoric acid (85% aqueous solution) were added to 30.5 g of ion-exchanged water, 18.55 g of molybdophosphoric acid was charged and completely dissolved therein to prepare an aqueous metal solution. The whole amount of the aqueous solution was added dropwise to 50 g of the above ZSM-5 zeolite-containing alumina support, followed by impregnation at room temperature for 3 hours. Thereafter, the whole was air-dried in a nitrogen stream and then dried at 120° C. for 16 hours in an air stream at atmospheric pressure in a muffle furnace to obtain Catalyst e.

Comparative Example 6

Alumina gel and H-ZSM-5 zeolite powder having an $SiO_2/Al_2O_3$ molar ratio of 35 were kneaded and, after extrusion molding, the whole was calcined at 600° C. for 2 hours to prepare a ZSM-5 zeolite molded body (H-ZSM-5 zeolite/alumina mass ratio=85/15), thereby Catalyst f being obtained.

[Properties of Prepared Catalyst]

Chemical properties and physical properties of the catalysts obtained in Examples 1 to 8 and Comparative Examples 1 to 5 are shown in Table 1.

In this connection, the specific surface area (SA) was measured by the BET method using a surface area-measuring apparatus (BELSORP 28) manufactured by Bel Japan, Inc. after the catalysts were degassed under vacuum at 400° C. for 1 hour. Moreover, the pore volume (PV) and mean pore diameter (MPD) were measured under conditions of contact angle: 130° and surface tension: 470 dyne/cm using (AUTO-PORE-9220) manufactured by Shimadzu Corp. after the catalysts were degassed under vacuum at 400° C. for 1 hour. Furthermore, the pore volume having a mean pore diameter ranging ±1.5 nm (MPD±1.5 nm) was also calculated from the results of the above measurement.

The carbon amount was determined by measuring a combustion product gas formed through pulverization of the catalysts in a mortar and subsequent combustion at 950° C. using a CHN analyzer (MT-5) manufactured by Yanagimoto Mfg. Co., Ltd.

TABLE 1

| Catalyst | | Chemical properties (% by mass) | | | | | | Physical properties | | | |
|---|---|---|---|---|---|---|---|---|---|---|---|
| | | ZSM-5 zeolite | SHY zeolite | SAPO-11 zeolite | H-beta zeolite | MoO₃ | CoO | | | | |
| Example 1 | A | 10 | — | — | — | 26.9 | 5.9 | | | | |
| Example 2 | B | 15 | — | — | — | 25.1 | 5.4 | | | | |
| Example 3 | C | 25 | — | — | — | 21 | 4.7 | | | | |
| Example 4 | D | 10 | — | — | — | 26.7 | 5.7 | | | | |
| Example 5 | E | 10 | — | — | — | 27 | 5.7 | | | | |
| Example 6 | F | 5 | — | — | — | 26.8 | 6 | | | | |
| Example 7 | G | — | — | 10 | — | 26.7 | 5.9 | | | | |
| Example 8 | H | — | — | — | 10 | 26.9 | 5.7 | | | | |
| Comparative Example 1 | a | 10 | — | — | — | 27.5 | 6 | | | | |
| Comparative Example 2 | b | — | — | — | — | 27 | 5.8 | | | | |
| Comparative Example 3 | c | 10 | — | — | — | 27 | 5.8 | | | | |
| Comparative Example 4 | d | — | 5 | — | — | 26.5 | 5.9 | | | | |
| Comparative Example 5 | e | 35 | — | — | — | 19.3 | 4.2 | | | | |
| Comparative Example 6 | f | 85 | — | — | — | — | — | | | | |

| Catalyst | | Chemical properties (% by mass) | | Physical properties | | | |
|---|---|---|---|---|---|---|---|
| | | P₂O₅ | C (organic acid) | SA (m²/g) | PV (ml/g) | MPD (nm) | MPD ± 1.5 nm (%) |
| Example 1 | A | 4.1 | 3.8 | 158 | 0.41 | 12.1 | 57 |
| Example 2 | B | 3.7 | 3.6 | 175 | 0.42 | 12 | 60 |
| Example 3 | C | 3.3 | 3.6 | 202 | 0.42 | 11.7 | 66 |
| Example 4 | D | 4.3 | 3.9 | 153 | 0.41 | 12.2 | 55 |
| Example 5 | E | 4.3 | 3.8 | 155 | 0.42 | 12.3 | 53 |
| Example 6 | F | 4 | 3.8 | 145 | 0.41 | 12.1 | 56 |
| Example 7 | G | 4.1 | 3.8 | 142 | 0.43 | 12.1 | 57 |
| Example 8 | H | 4 | 3.8 | 183 | 0.55 | 12.1 | 55 |
| Comparative Example 1 | a | 4.1 | 0 | 150 | 0.43 | 14.1 | 52 |
| Comparative Example 2 | b | 4.1 | 3.8 | 166 | 0.45 | 12.3 | 55 |
| Comparative Example 3 | c | 4.1 | 0 | 146 | 0.44 | 12.9 | 53 |
| Comparative Example 4 | d | 3.9 | 3.8 | 159 | 0.43 | 12.3 | 53 |
| Comparative Example 5 | e | 2.9 | 3.1 | 211 | 0.42 | 11.8 | 67 |
| Comparative Example 6 | f | — | — | 349 | 0.50 | — | — |

[Activity Evaluation of Prepared Catalyst]

A fixed bed flow-type microreactor was packed with 100 ml of each of the catalysts obtained in Examples and Comparative Examples. Presulfiding was carried out by maintaining the catalyst at a reaction temperature of 320° C. for 24 hours under the following conditions: hydrogen partial pressure=4.9 MPa, LHSV=1.5 h⁻¹, H₂/Oil=200 Nm³/kl. The same hydrocarbon oil was used for the presulfiding and evaluation of catalyst activity.

The evaluation of catalyst activity was carried out under four activity evaluation conditions of Condition 1 to Condition 4 shown in Table 2. On this occasion, the reaction-product oil was subjected to property analysis of product oil after in situ stripping. In this connection, density was calculated from the ratio of the density of the target substance at 15° C. to the density of distilled water at 4° C.

TABLE 2

| | | Condition 1 | Condition 2 | Condition 3 | Condition 4 |
|---|---|---|---|---|---|
| Properties of raw material hydrocarbon oil | | | | | |
| Density (15/4° C.) | (g/cm³) | 0.8528 | 0.8528 | 0.8623 | 0.8528 |
| Sulfur content | (% by mass) | 1.21 | 1.21 | 1.74 | 1.21 |
| Nitrogen | (% by mass) | 0.0095 | 0.0095 | 0.012 | 0.0095 |
| Wax deposit content at −10° C. | (% by mass) | 4.3 | 4.3 | 5.4 | 4.3 |
| Distillation properties | | | | | |
| IBP | (° C.) | 241 | 241 | 186 | 241 |
| T50 | (° C.) | 306 | 306 | 316 | 306 |
| T90 | (° C.) | 362 | 362 | 356 | 362 |
| FBP | (° C.) | 392 | 392 | 372 | 392 |

TABLE 2-continued

|  |  | Condition 1 | Condition 2 | Condition 3 | Condition 4 |
|---|---|---|---|---|---|
| Conditions for activity evaluation |  |  |  |  |  |
| Reaction temperature | (° C.) | 340 | 350 | 350 | — (Note) |
| LHSV | (h$^{-1}$) | 0.75 | 1 | 1.5 | 1 |
| Hydrogen partial pressure | (MPa) | 6.4 | 5 | 5 | 6.4 |
| H$_2$/Oil | (Nm$^3$/kl) | 230 | 230 | 200 | 230 |

(Note)
Stability performance of catalyst activity was evaluated by adjusting the reaction temperature so that the sulfur concentration in the product oil is 8 mass ppm.

With the use of Catalysts A to E and Catalysts G and H and Catalysts a to c prepared by Examples 1 to 5 and Examples 7 and 8 and Comparative Examples 1 to 3, the activity evaluation was carried out under Condition 1 in the above Table 2. Table 3 shows results of measuring sulfur concentration and wax deposit content at 10° C. in the product oil on the 30th day of operation.

On this occasion, with regard to the wax deposit content, 10 mg of a sample was cooled from room temperature at a rate of −3° C./minute by a differential scanning calorimeter (hereinafter abbreviated as "DSC") and the amount of wax precipitate at a point of −10° C. was calculated from the calorie of an exothermic peak on a DSC curve in accordance with the following equation.

$$W = (Cs/(Cw \times F)) \times 100$$

W: wax deposit content (% by mass) of sample at test temperature
Cs: calorie (J/g) of exothermic peak of sample on DSC curve
Cw: calorie (J/g) of wax precipitate of light gas oil at −10° C.
F: calorie correction coefficient

TABLE 3

| Catalyst | Sulfur concentration (mass ppm) | Wax deposit content (% by mass) |
|---|---|---|
| A | 7 | 1.8 |
| B | 8 | 1.4 |
| C | 10 | 0.2 |
| D | 8 | 1.6 |
| E | 8 | 1.7 |
| G | 10 | 2.3 |
| H | 10 | 3.0 |
| a | 22 | 1.8 |
| b | 13 | 4.3 |
| c | 32 | 1.8 |

Moreover, Catalyst F and Catalyst d prepared by Example 6 and Comparative Example 4 were subjected to activity evaluation under Condition 2 in the above Table 2. Table 4 shows results of measuring sulfur concentration and wax deposit content at 10° C. in the product oil on the 10th day of operation.

TABLE 4

| Catalyst | Sulfur concentration (mass ppm) | Wax deposit content (% by mass) |
|---|---|---|
| F | 10 | 2.1 |
| d | 10 | 4.2 |

Furthermore, Catalyst C and Catalyst e prepared by Example 3 and Comparative Example 5 and a catalyst system which is a combination formed by laminating Catalyst d and Catalyst f prepared by Comparative Example 4 and Comparative Example 6 were evaluated. The combination ratio of the combined catalyst system was catalyst d/catalyst f/catalyst d=35/30/35 (% by mass). With regard to each catalyst system, activity evaluation was carried out under Condition 3 in the above Table 2. Table 5 shows results of measuring sulfur concentration and wax deposit content at 10° C. in the product oil on the 7th day of operation.

TABLE 5

| Catalyst | Sulfur concentration (mass ppm) | Wax deposit content (% by mass) |
|---|---|---|
| C | 9 | 0.2 |
| e | 23 | 0.2 |
| d/f/d | 21 | 0.2 |

Figure 1:
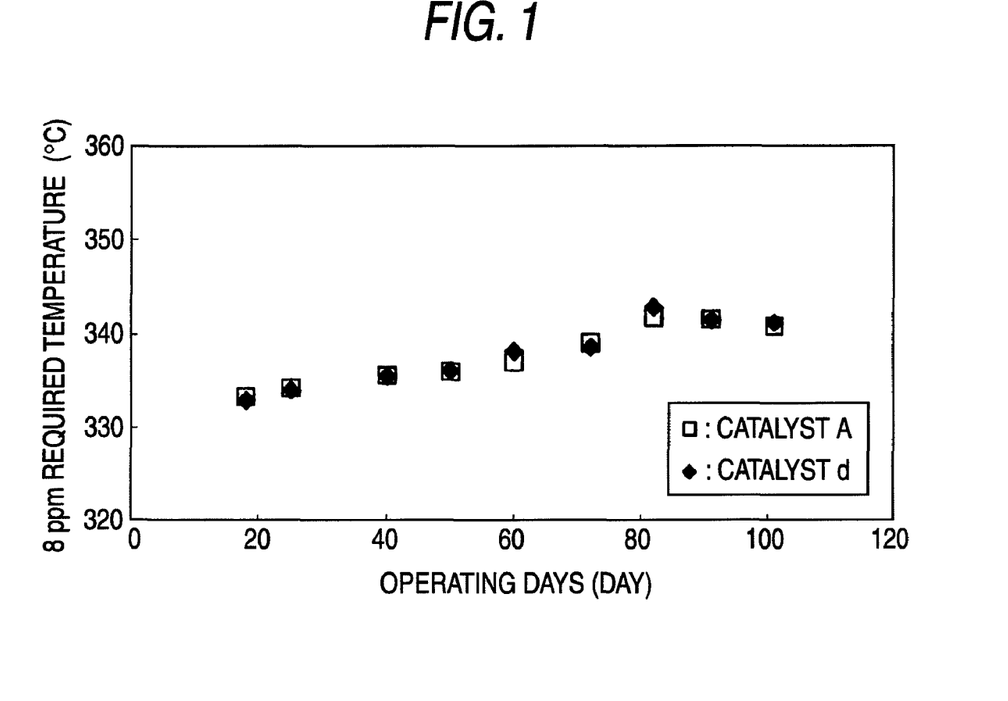
FIG. 1 is a graph showing change in required temperature for controlling sulfur concentration in a product oil in a long-term stability test of Catalyst A and Catalyst d prepared in Example 1 and Comparative Example 4.

With regard to Catalyst A and Catalyst d prepared by Example 1 and Comparative Example 4, long-term stability test was carried out under Condition 4 in the above Table 2. On this occasion, stability performance of catalyst activity was evaluated by adjusting the reaction temperature so that the sulfur concentration in the product oil is 8 mass ppm. FIG. 1 shows change in required temperature for adjusting the product oil sulfur concentration to 8 mass ppm vs operation days and FIG. 2 shows change in wax deposit content at −10° C. in the product oil.

Figure 2:
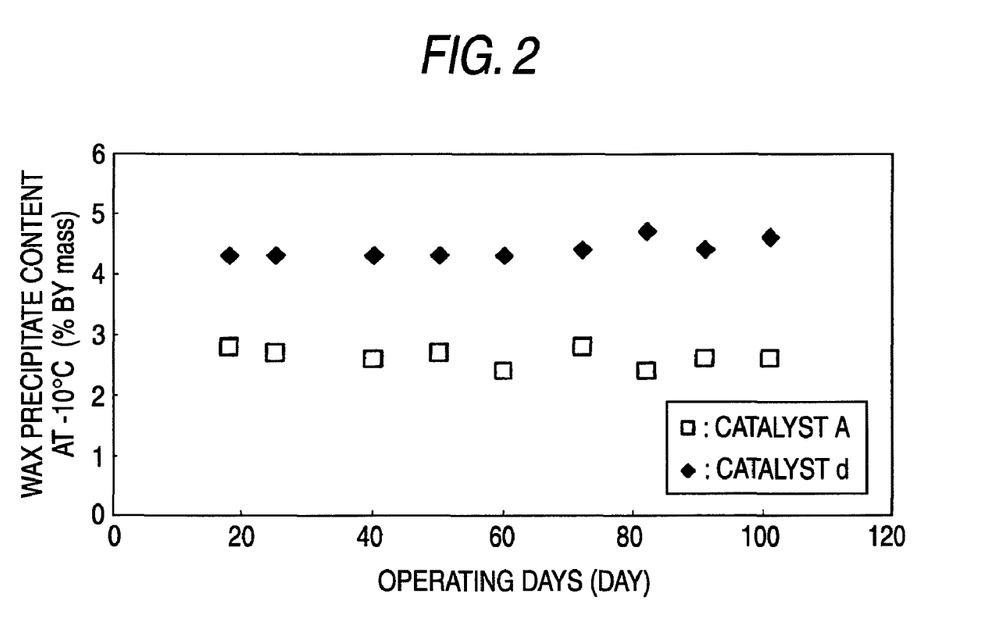
FIG. 2 is a graph showing change in wax deposit content at −10° C. in a product oil in a long-term stability test of Catalyst A and Catalyst d prepared in Example 1 and Comparative Example 4.

As apparent from Table 3 to Table 5 and FIG. 1 and FIG. 2, the catalysts according to the invention exhibited excellent desulfurization performance and dewaxing performance and thus it has been shown that sulfur compounds in hydrocarbon oils can be desulfurized to a high degree and simultaneously the catalysts are sufficiently effective for reduction of wax deposit content and have a stable catalyst performance over a long period of time. Furthermore, it has been shown that hydrocarbon oils having a sulfur concentration of 10 ppm or less and a wax deposit content at −10° C. of 3.0% by mass or less can be produced with the use of the catalysts of the invention.

A product oil was collected at a time point on the 100th day of operation and a light fraction of 150° C. or higher was removed by means of a fine distillation apparatus (the removed ratio corresponded to about 1.4% by mass of the total amount in the case of the product oil with Catalyst A and corresponded to 1.2% by mass of the total amount in the case of the product oil with Catalyst d). Thereafter, 10% by volume of kerosene based on the amount of light gas oil after mixing was mixed with the product oil produced with Catalyst A and 30% by volume of kerosene based on the amount of light gas oil after mixing was mixed with the product oil produced with Catalyst d, thereby mixed light gas oils A and d being prepared, respectively.

With regard to the mixed light gas oils A and d, after a fluidity-improving agent was added under the same conditions, a cold filter pugging point and a pour point as indices of low-temperature fluidity were measured. As a result, the pour point of the mixed light gas oils A and d was −15° C. and the cold filter pugging point thereof was −12° C., thus they showing the same values, which respectively satisfied the pour point of −7.5° C. or lower and the cold filter pugging point of −5° C. or lower which are indices of low-temperature fluidity required for No. 2 light gas oil of JIS standard. Accordingly, it is found out that the light gas oil base material produced by the catalyst of the invention can reduce the mixing amount of kerosene required for securing low-temperature fluidity by 20% by volume as compared with the light gas oil base material produced by the conventional catalyst.

As above, according to the catalysts of the invention, it becomes possible to improve low-temperature fluidity performance with satisfying the required sulfur concentration as a diesel fuel, so that the kerosene fraction, which has been hitherto mixed for improving low-temperature fluidity performance, can be remarkably reduced.

While the invention has been described in detail and with reference to specific embodiments thereof, it will be apparent to one skilled in the art that various changes and modifications can be made therein without departing from the spirit and scope thereof. The present application is based on Japanese Patent Application No. 2006-249445 filed on Sep. 14, 2006, and the contents are incorporated herein by reference.

The invention claimed is:

1. A catalyst for hydrodesulfurization/dewaxing of a hydrocarbon oil, which comprises
   a support comprising an inorganic oxide containing at least one crystalline aluminosilicate having a one- or two-dimensional pore path system, an $SiO_2/Al_2O_3$ ratio (mol/mol) of 15 to 200 and maximum pore diameter of 0.4 to 0.72 nm, and,
   having provided on the support, 10 to 35% by mass of at least one selected from metals in Group 6 of the Periodic Table, 1 to 10% by mass of at least one selected from metals in Group 8 of the Periodic Table, and 1.5 to 6% by mass of phosphorus, each in terms of their oxides, on the basis of the weight of the catalyst,
   and 2 to 14% by mass of carbon derived from an organic acid in terms of element amount on the basis of the weight of the catalyst,
   wherein the content of the crystalline aluminosilicate is in an amount of 3 to 25% by mass on the basis of the weight of the support.

2. The catalyst for hydrodesulfurization/dewaxing of a hydrocarbon oil according to claim 1, wherein specific surface area is 100 to 350 m²/g, pore volume is 0.35 to 0.6 ml/g, and mean pore diameter is 6 to 20 nm.

3. A process for producing the catalyst for hydrodesulfurization/dewaxing of a hydrocarbon oil according to claim 1, which comprises:
   Supporting a composition on a support comprising an inorganic oxide containing 3 to 25% by mass of at least one crystalline aluminosilicate having a one- or two-dimensional pore path system an $SiO_2/Al_2O_3$ ratio (mol/mol) of 15 to 200 and a maximum pore diameter of 0.4 to 0.72 nm, on the basis of the weight of the support with the use of a solution containing at least one compound containing a metal in Group 6 of the Periodic Table, at least one compound containing a metal in Group 8 of the Periodic Table, an organic acid, and phosphoric acid, so that the metal in Group 6 of the Periodic Table in the composition accounts for 10 to 35% by mass, the metal in Group 8 of the Periodic Table in the composition accounts for 1 to 10% by mass, phosphorus in the composition accounts for 1.5 to 6% by mass, each in terms of their oxides, on the basis of the weight of the catalyst, and carbon derived from an organic acid in the composition accounts for 2 to 14% by mass in terms of element amount on the basis of the weight of the catalyst, and subsequently;
   drying at 200° C. or lower without calcination treatment at higher than 200° C. to finish a catalyst.

4. A process for hydrotreating a hydrocarbon oil, which comprises producing a hydrocarbon oil having a sulfur content in the product oil of 10 mass ppm or less and a wax deposit content at −10° C. of 3.0% by mass using a hydrocarbon oil having a boiling point range of 150° C. to 450° C. as a raw oil under a hydrogen partial pressure of 3 to 13 MPa, a temperature of 300 to 400° C., a liquid hourly space velocity of 0.3 to 5 h⁻¹, and a hydrogen/oil ratio of 100 to 1000 Nm³/kl in the presence of the catalyst according to claim 1.

* * * * *